(12) United States Patent
Middleton et al.

(10) Patent No.: US 12,453,837 B2
(45) Date of Patent: Oct. 28, 2025

(54) URINARY CATHETER AND METHOD OF CATHETERISING A BLADDER USING AN ACTIVELY DEFLECTABLE URETHRAL CATHETER AND A DEFLECTION MECHANISM

(71) Applicant: Middleton Medical Innovations Pty Ltd, Camberwell (AU)

(72) Inventors: Ian S. Middleton, Lenah Valley (AU); Dougal L. Middleton, Cairns (AU); Rory L. Middleton, South Melbourne (AU)

(73) Assignee: Middleton Medical Innovations Pty Ltd, Victoria (AU)

( * ) Notice: Subject to any disclaimer, the term of this patent is extended or adjusted under 35 U.S.C. 154(b) by 536 days.

(21) Appl. No.: 17/595,042

(22) PCT Filed: Sep. 11, 2020

(86) PCT No.: PCT/AU2020/050972
§ 371 (c)(1),
(2) Date: Nov. 5, 2021

(87) PCT Pub. No.: WO2021/051158
PCT Pub. Date: Mar. 25, 2021

(65) Prior Publication Data
US 2022/0241551 A1 Aug. 4, 2022

(30) Foreign Application Priority Data
Sep. 16, 2019 (AU) ................. 2019903441

(51) Int. Cl.
*A61M 25/00* (2006.01)
*A61M 25/01* (2006.01)
*A61M 25/10* (2013.01)

(52) U.S. Cl.
CPC ...... *A61M 25/008* (2013.01); *A61M 25/0026* (2013.01); *A61M 25/0147* (2013.01);
(Continued)

(58) Field of Classification Search
CPC ............ A61M 25/008; A61M 25/0026; A61M 25/0054; A61M 25/0068; A61M 25/0017;
(Continued)

(56) References Cited

U.S. PATENT DOCUMENTS

| 3,867,945 | A | * | 2/1975 | Long ................. | A61M 25/0041 606/108 |
| 2004/0073158 | A1 | * | 4/2004 | Shah ...................... | A61L 29/18 604/19 |
| 2004/0220470 | A1 | * | 11/2004 | Karmarkar ........... | G01R 33/287 600/423 |
| 2011/0218520 | A1 | * | 9/2011 | Andrich ............ | A61M 25/0041 604/544 |

(Continued)

FOREIGN PATENT DOCUMENTS

| CN | 203183482 U | 9/2013 |
| CN | 107050627 A | 8/2017 |

(Continued)

OTHER PUBLICATIONS

ISA Australian Patent Office, International Search Report Issued in Application No. PCT/AU2020/050972, Nov. 27, 2020, WIPO, 4 pages.

*Primary Examiner* — Jessica Arble
*Assistant Examiner* — Meagan Ngo
(74) *Attorney, Agent, or Firm* — Alleman Hall & Tuttle LLP

(57) ABSTRACT

A urinary catheter with deflectable tip, comprising a hollow catheter body configured to be inserted within the urethra of a patient, the catheter body having an elongate portion, a tip portion near a distal end of the elongate portion and an engagement portion spaced from the distal end where a user can grasp the catheter, the tip portion being deflectable for the purpose of steering the catheter within the urethra to (Continued)

allow the catheter to follow a natural curvature of the urethra, the tip portion being movable from a generally straight condition to a deflected condition wherein deflection of the tip portion occurs while the elongate portion remains generally straight.

18 Claims, 15 Drawing Sheets

(52) U.S. Cl.
CPC ..... *A61M 25/10* (2013.01); *A61M 2025/0037* (2013.01); *A61M 2025/0081* (2013.01); *A61M 2210/1085* (2013.01); *A61M 2210/1096* (2013.01)

(58) Field of Classification Search
CPC .............. A61M 25/0067; A61M 25/00; A61M 2025/0037; A61M 25/0147; A61M 25/0133; A61M 25/0013; A61M 2025/0063; A61M 2210/41089; A61M 27/008; A61M 2202/0496
See application file for complete search history.

(56) References Cited

U.S. PATENT DOCUMENTS

| | | | | |
|---|---|---|---|---|
| 2012/0136319 | A1* | 5/2012 | Triel | A61M 25/0017 604/264 |
| 2012/0203210 | A1* | 8/2012 | Schanz | A61M 25/0017 604/544 |
| 2013/0165905 | A1* | 6/2013 | Pinchuk | A61M 25/0017 604/544 |
| 2016/0045712 | A1* | 2/2016 | Neoh | A61M 25/0147 604/95.04 |
| 2016/0367787 | A1* | 12/2016 | Van Hoven | A61F 2/246 |
| 2017/0258614 | A1* | 9/2017 | Griffin | A61M 25/0147 |
| 2017/0368304 | A1* | 12/2017 | Cole | A61M 25/0152 |
| 2021/0121188 | A1* | 4/2021 | Yurek | A61M 1/85 |

FOREIGN PATENT DOCUMENTS

| | | |
|---|---|---|
| CN | 108853689 A | 11/2018 |
| GB | 1116317 A | 6/1968 |
| WO | 2010049735 A1 | 5/2010 |
| WO | 2014043586 A1 | 3/2014 |
| WO | 2017/158069 A1 | 9/2017 |
| WO | 2019152727 A1 | 8/2019 |

* cited by examiner

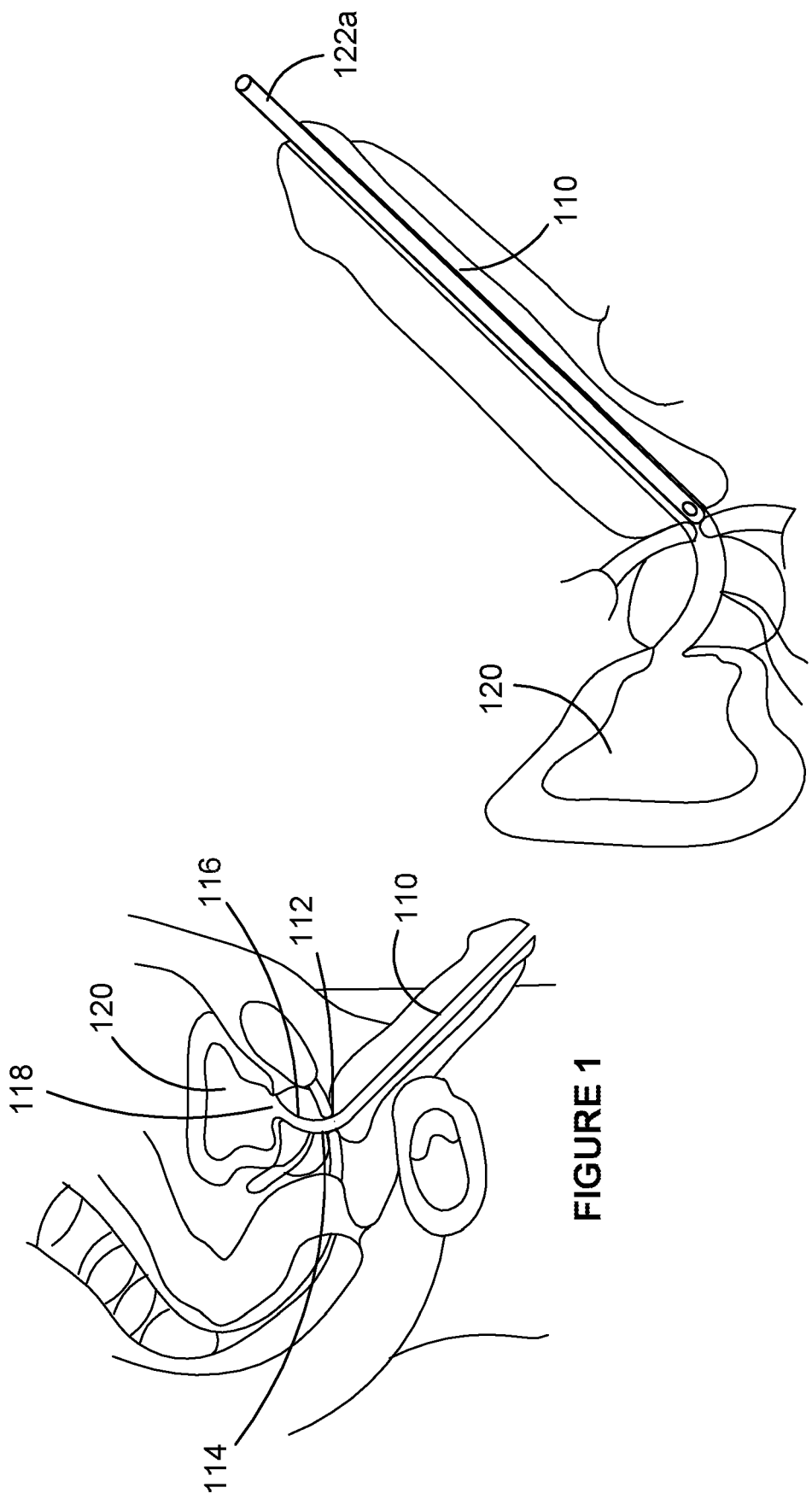

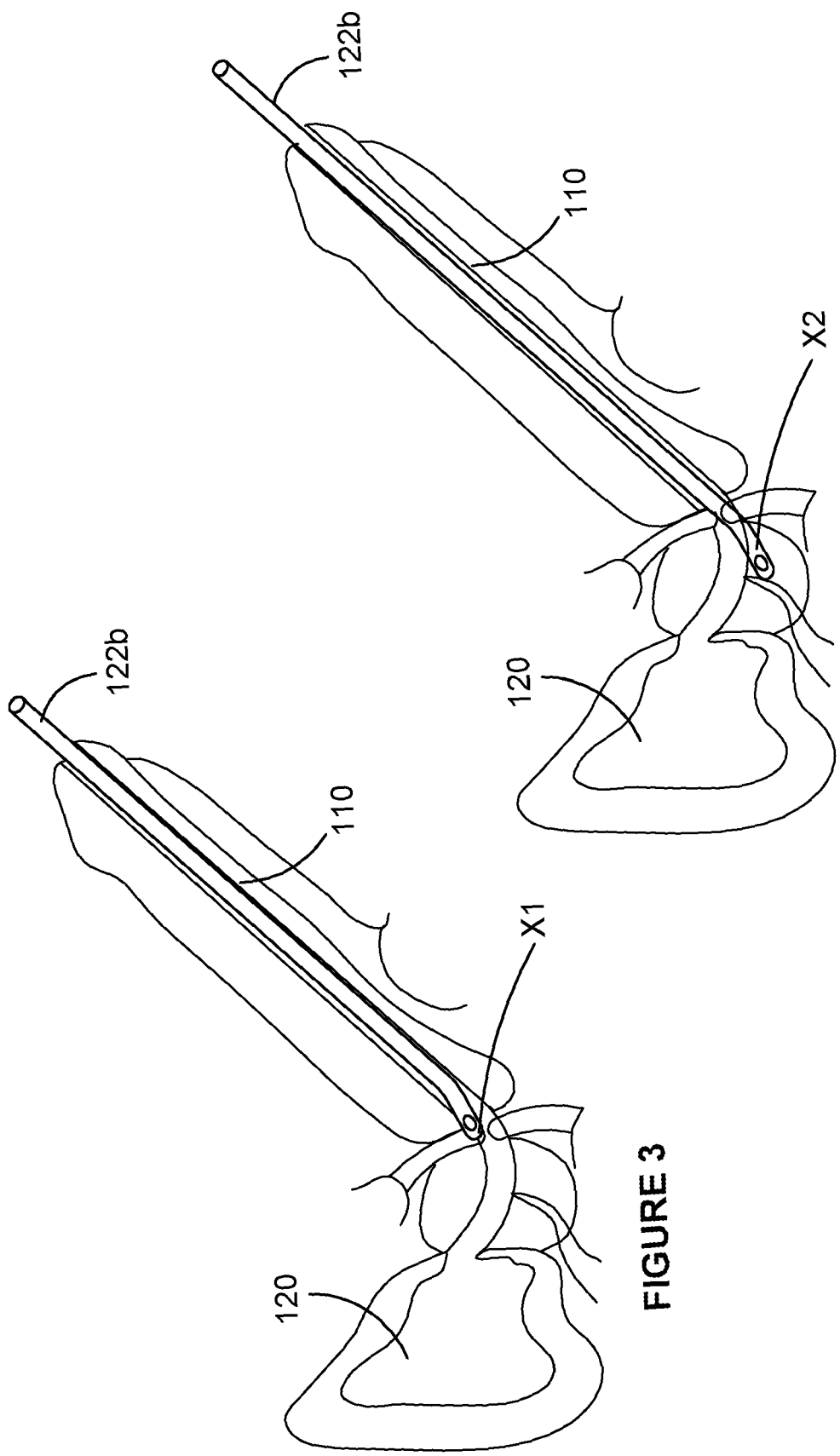

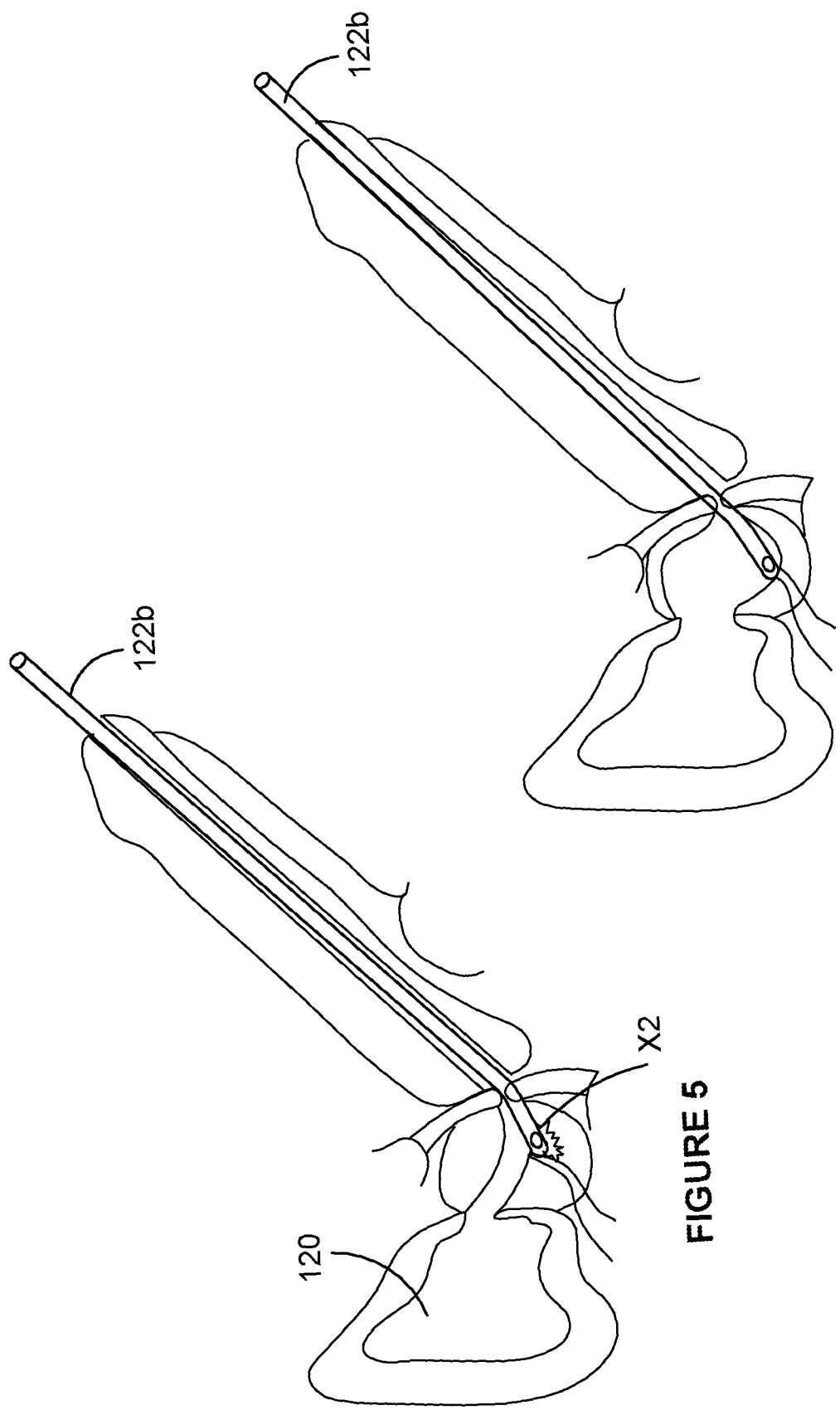

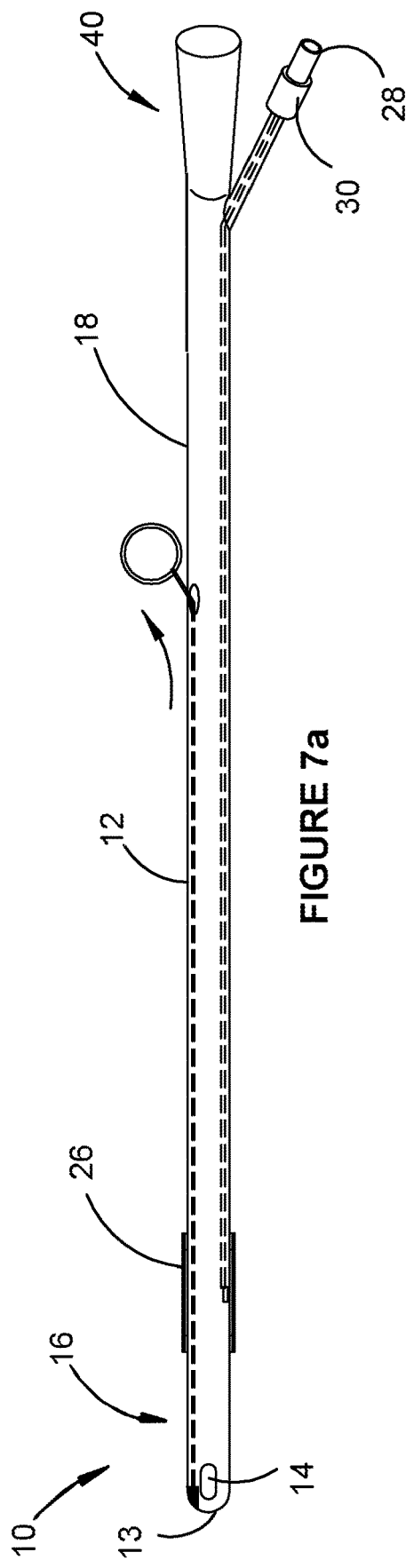
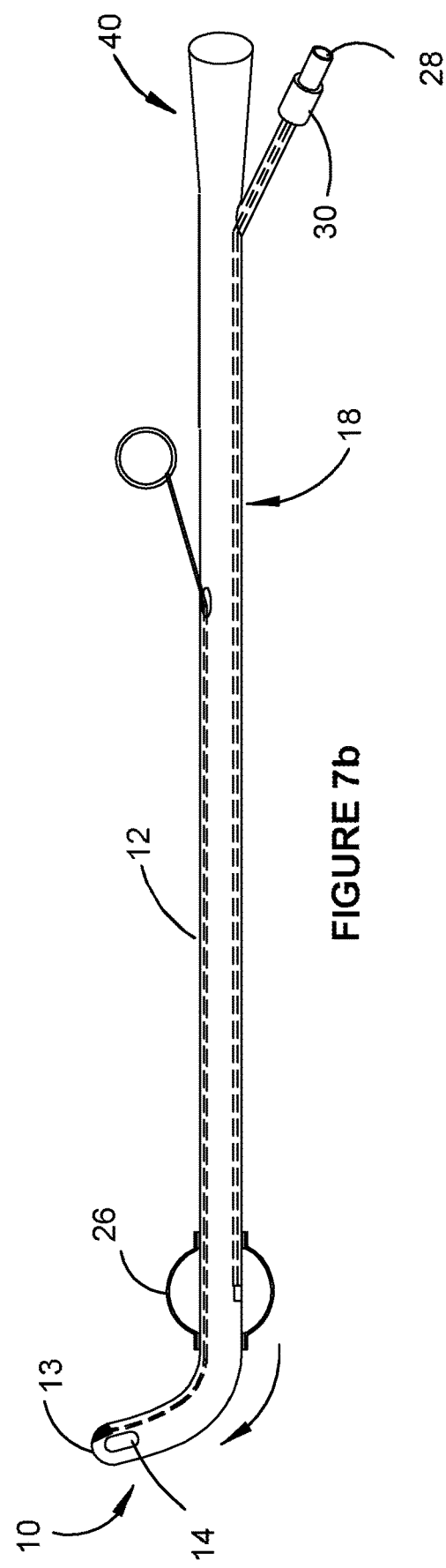
FIGURE 7a
FIGURE 7b

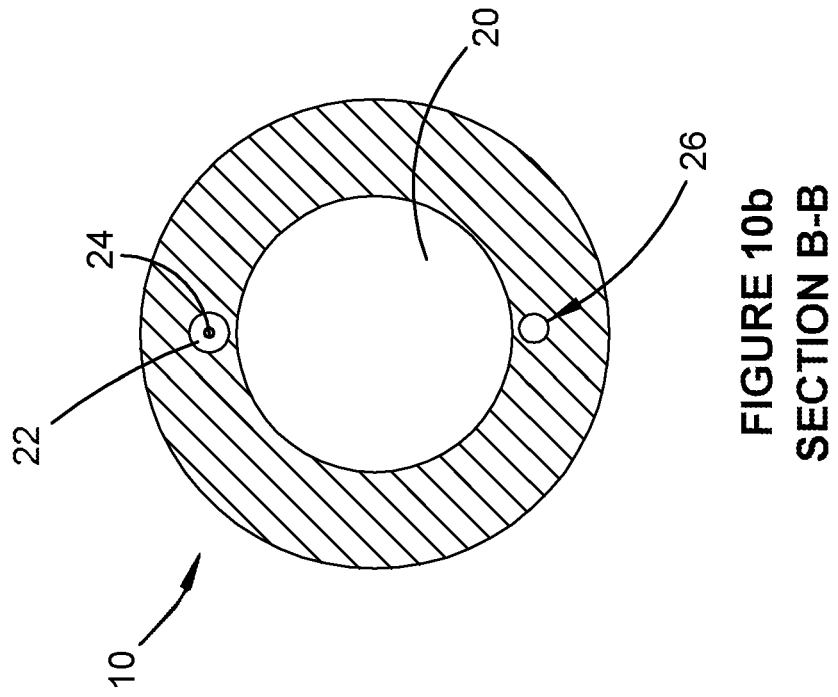
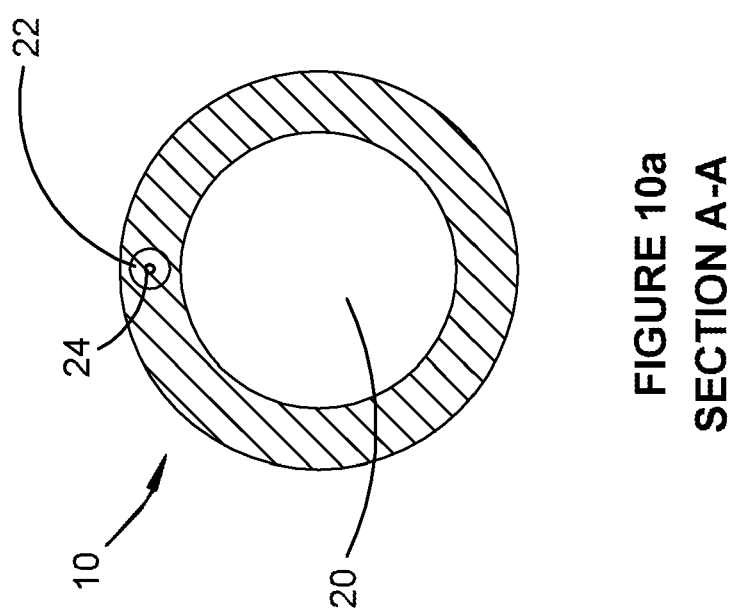
FIGURE 10b SECTION B-B
FIGURE 10a SECTION A-A

SECTION D-D

SECTION C-C

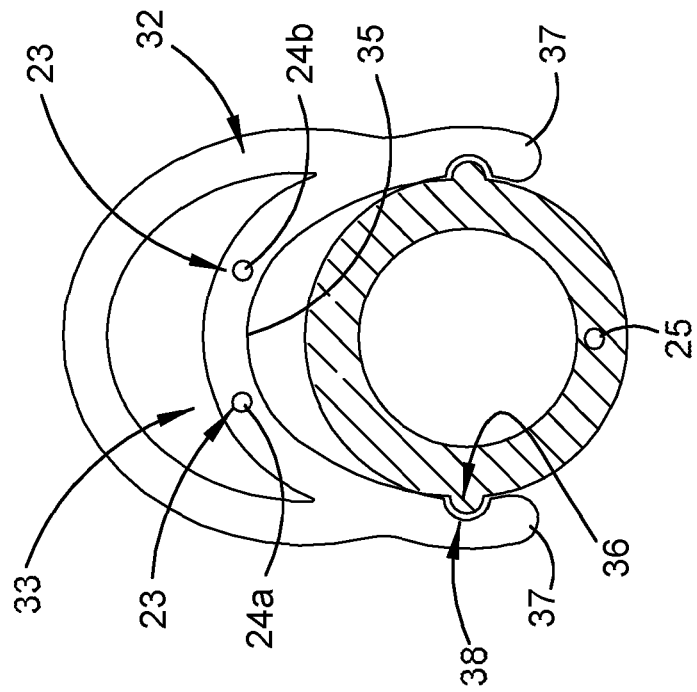
FIGURE 14a SECTION C-C
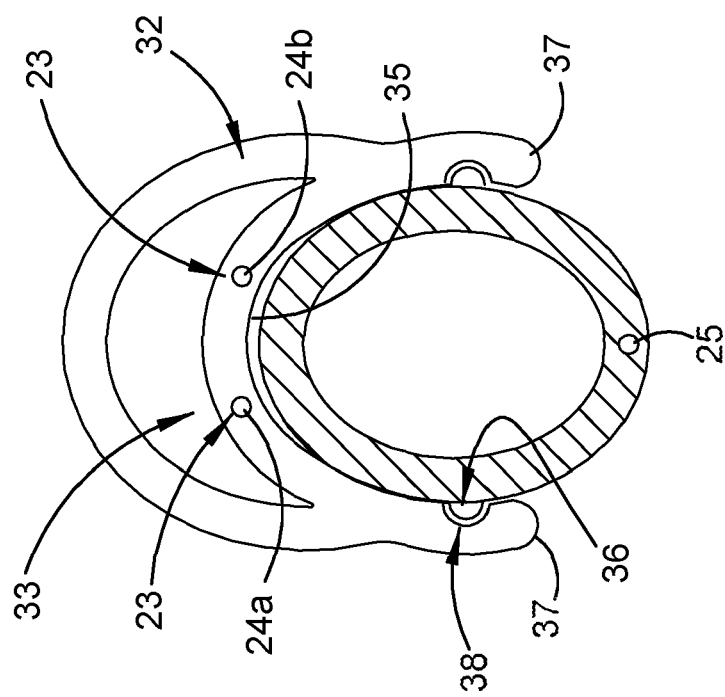
FIGURE 14b SECTION D-D

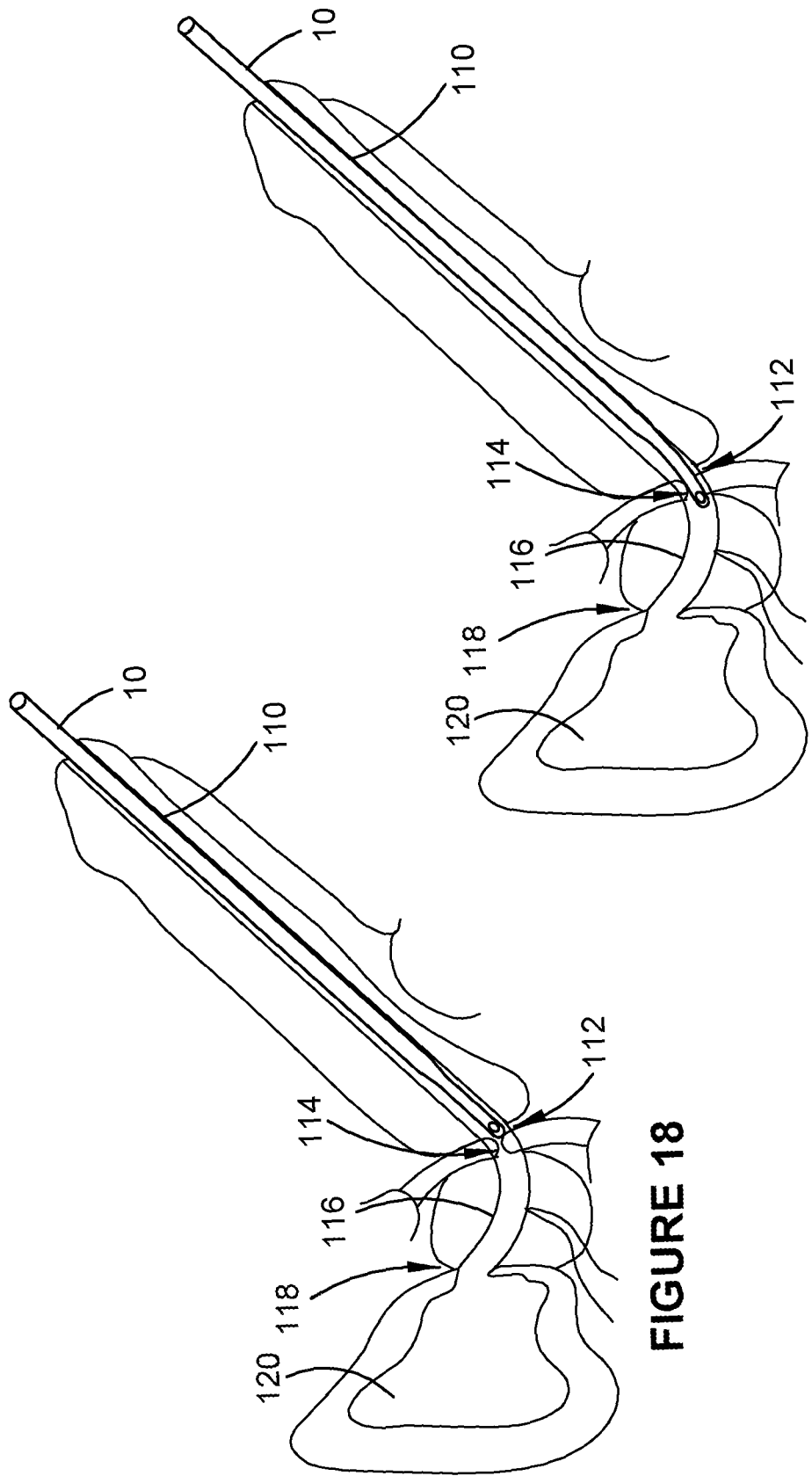

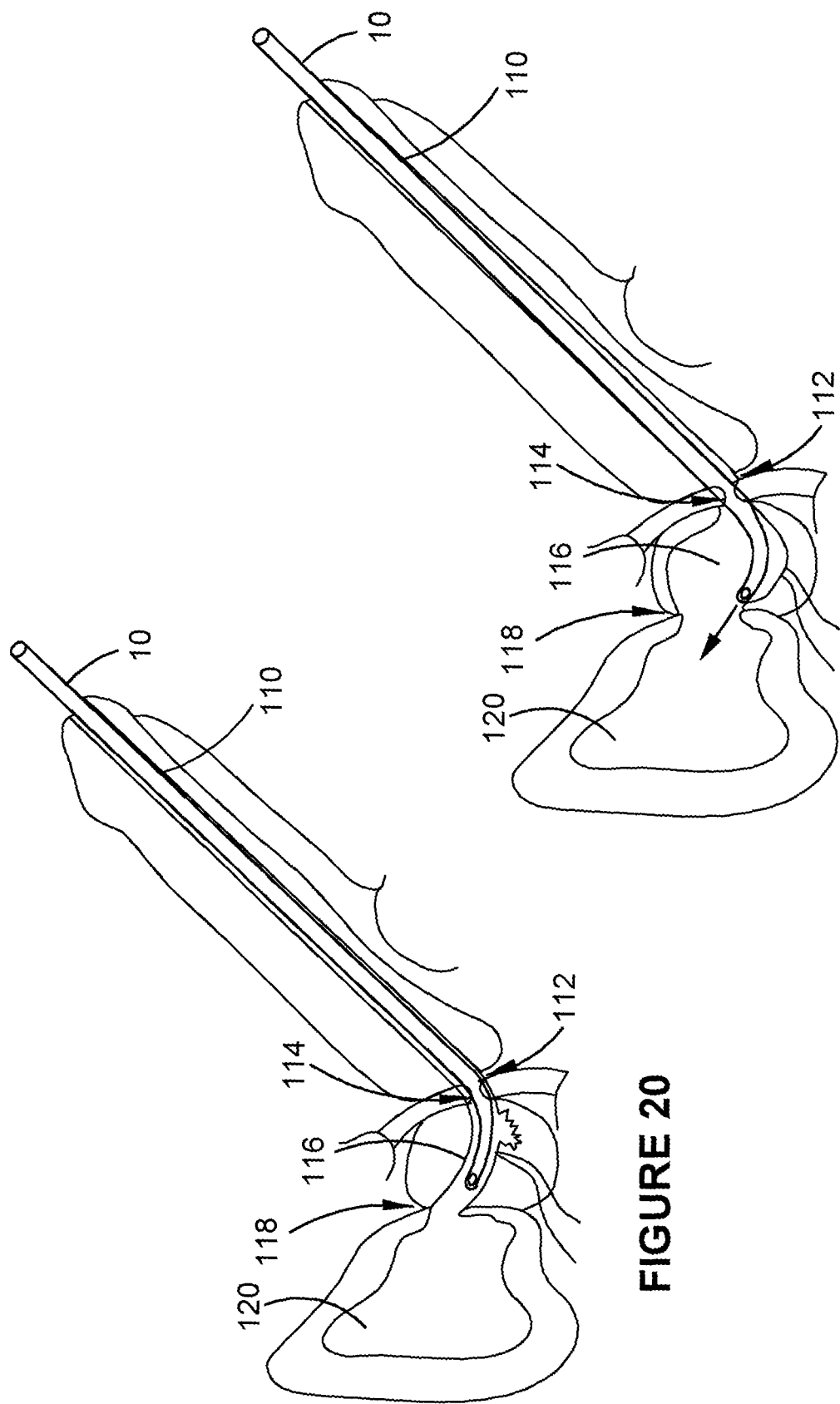

URINARY CATHETER AND METHOD OF CATHETERISING A BLADDER USING AN ACTIVELY DEFLECTABLE URETHRAL CATHETER AND A DEFLECTION MECHANISM

FIELD OF THE INVENTION

The present invention relates to a urinary catheter and method of catheterising the bladder of a male patient using an actively deflectable urethral catheter and a deflection mechanism.

BACKGROUND

Inserting a bladder catheter into the urethra of a male patient may be required in many medical situations. It is a common task for hospital medical and nursing staff, and it can be a difficult procedure due to the curvature of the male urethra as it passes up through the prostate gland, particularly if there has been previous prostatic surgery. If difficulty is encountered, a urological surgeon is often called to assist.

At present, three commonly used options used for catheterisation of a male urethra include a simple straight flexible urethral catheter, a Coudé tip catheter with a fixed curve and a simple straight catheter into which a rigid catheter introducer is inserted.

A simple straight flexible urethral catheter is lubricated and simply pushed up the urethra, and in the majority of cases, will follow the natural curve of the urethra and enter the bladder without significant trauma to the urethra. Generally straight urinary catheters have limited flexibility, because the catheter has to be stiff enough to push up the urethra. This limited flexibility may not be sufficient to allow the catheter to follow the urethral curve unless the urethra is straightened by the catheter, and this may result in urethral damage or a so called 'false passage' in the wall of the urethra.

Also, if there is a slight irregularity of the urethral lining, or there is scarring or more major deviations in the urethral tube, the catheter will simply not pass, and in a significant number of cases, the catheter tip causes at least some damage to the urethra. Studies have shown that catheterisation can be difficult in up to 20% of cases. Presently available generally straight catheters cannot be steered during the catheterisation process.

In an attempt to overcome this problem, catheters with a fixed curved tip (Coudé tip) have been devised and produced, to facilitate the passage of the catheter around the curved urethra. These catheters however are not truly steerable, and will only pass readily if the curve of the particular urethra happens to be the same as that of the catheter tip. The fixed curve of the catheter tip also often makes passage of the catheter difficult through the distal part of the urethra, which is straight. In practice, the curve chosen during the design of a Coudé tip catheter is a compromise between the full angle of the curved urethra and the zero degree angle of the straight section of the urethra.

If a catheter introducer is used, this curved, rigid metal rod is inserted into a simple, straight, flexible catheter prior to passage of the catheter up the urethra. Because it is curved to match the full curve of a male urethra, it is difficult and potentially dangerous to pass up the straight section of the urethra, but is shaped to have enough angle of curvature to comply with the full curve of the urethra. Because catheter introducers are rigid and will cause major trauma to the urethra if not perfectly inserted, they are usually not used by any medical professionals apart from actual urologists.

The problems noted above have resulted in a need for a new catheter design which will have all or most of the advantages of both a Coudé tip catheter and an introducer, but few or preferably none of the disadvantages. What is needed is a truly steerable urethral catheter.

Steerable devices including telescopes and catheters have been developed to navigate within a number of body organs including the bowel and blood vessels, (eg GB1116317, CN108853689 and CN203183482)), and also within parts of the urinary tract, including the bladder and kidneys. These devices utilise various types of steering mechanism, which may include steering wires and a steering control mechanism. Guidance may be by direct visualisation via a telescope (eg WO2014043586) or camera, or by radiological guidance utilising various modalities including fluoroscopy (eg WO2019152727). Each device may have individual characteristics which make it suitable for that particular body location, and the exact purpose for which it was intended, but may make it completely unsuitable for use as a urinary catheter steerable within the urethra itself.

As an example, the cystoscopy catheter documented in WO2014043586 is designed to act as both a flexible, potentially steerable, sheathe for a cystoscope or therapeutic instrument within the bladder, and an indwelling bladder catheter, but it is not designed to be deflected within the urethra or to facilitate passage of the catheter up the urethra.

As another example, the catheter in WO2019152727, is designed to be deflectable only within the kidney, and is not designed to be deflected within the urethra or to facilitate passage of the catheter up the urethra or to drain the urinary bladder.

As noted above, a significant problem for the management of male patients who require a urinary catheter is the actual passage of the catheter up the urethra and into the bladder, because of the curved and irregular shape of the male urethra. Previous catheter designs have not allowed adequate manipulation of the catheter within the urethra to accommodate the individual anatomy of the particular urethra to be catheterised. What is required is a steerable catheter with particular design features which will make it suitable for that purpose. These characteristics are different in many respects to devices which may have been designed to be steerable in other parts of the urinary tract.

Because bladder catheterisation via the urethra has to be performed in the community, in patients' homes, in doctors' offices, in emergency departments and on hospital wards, it must be possible to perform catheterisation in the majority of cases without the need for telescopic or radiological guidance, which are too expensive and impractical to use routinely for what is generally a minor procedure. As such, the catheter must be insertable by tactile sensation or 'feel', as described further below.

The procedure must also be suitable to be performed by community and hospital nurses, other health care workers, junior doctors and indeed the patients themselves in certain circumstances (self catheterisation), and a complex steering mechanism is completely unsuitable for such purpose.

The appropriate catheter should be designed specifically to be steerable within the urethra, which does not require multidirectional deflection, or rotation, as is necessary within the bladder or kidney. This is because of the specific anatomical characteristics of the urethra compared to other parts of the urinary tract. The design also needs to take into account the anatomical reasons why the catheter may be impeded, as described in more detail later, and illustrated in diagrams.

The angle of curvature of a catheter designed to be steered up the male urethra is completely different to the angle required for a catheter or telescope designed to function optimally in the bladder or kidney. In particular, curvature of the urethra is usually more than 45 degrees upwards, and never more than 90 degrees. In contrast, the angle of curvature of a catheter in the kidney needs to be acute, ideally to over 90 degrees in opposite directions, and with a much smaller radius of arc, if it is to fit within the tight confines of the kidney collecting system. To obtain a total arc of deflection, the deflecting segment of the tip needs to be significantly longer, of the order of 5 to 6 cms. A deflectable device in the bladder also needs to be able to deflect to more than 90 degrees if it is to be able to access all surfaces of the bladder, including the bladder neck, and the arc of deflection would normally be much smaller than the gradual deflection which is optimal for the urethra. Such acute deflection of a catheter in the urethra would just result in impingement of the tip of the catheter on the anterior urethral wall.

As the proximal urethra does not deviate laterally, but passes in the same sagittal plane throughout its curved course, the catheter only needs to be able to deflect upwards from the horizontal, and does not have to be able to deflect laterally or be rotated. Because the only variation in a normal urethra is therefore in its length, and the actual angle of the upward curvature, the ideal actively deflectable catheter only has to be able to be deflectable between zero and 90 degrees to the horizontal, and in the same sagittal plane. The natural elastic recoil of the catheter will result in straightening of the catheter tip if traction is decreased or removed, so active deflection only needs to be in the single direction upwards.

A fully steerable device is therefore not required and would necessitate a bigger, heavier and more complex steering mechanism, such as may be required in the bladder or kidneys. Such a complex mechanism is likely to be expensive to produce, and also less likely to be suitable to be disposable, which is a virtual pre-requisite for a urethral catheter. A more complex mechanism may also be less likely to be detachable, which is also a highly desirable characteristic of a deflection mechanism incorporated into a urethral catheter.

The anatomy of the male urethra is illustrated in FIG. 1. It can be seen that for successful catheterisation, a catheter has to pass through a number of potential sites of obstruction. Its passage starts with the generally straight penile urethra 110 before meeting its first obstacle at the curved junction of the bulbar urethra 112 and membranous urethra 114. The catheter then has to pass through the prostatic urethra 116 before moving through the bladder neck 118 and into the bladder 120.

The catheterisation process is illustrated with reference to FIGS. 2 to 4, firstly with a straight catheter 122a in FIG. 2 and also with a catheter 122b having a curved Coudé tip.

Immediately prior to insertion of the tip of the catheter into the urethra, the user places manual traction on the penis in order to steady it, and importantly to straighten the penile urethra 110, so that the catheter tip is more likely to pass this part of the urethra without any resistance. Whilst such traction straightens the penile urethra, the prostatic, membranous and bulbar sections of the urethra are relatively fixed to surrounding structures and the upward curve of the urethra from bulbar urethra to bladder neck, is not significantly straightened by such traction. Thus a catheter has to be able to pass through the straight section of the penile urethra, but also be able to pass up the curved proximal urethra.

The catheter is introduced with lubricant into the penile (distal) urethra and passed along the straightened distal urethra. This is usually the easiest part of insertion of a catheter, provided that the catheter is straight and the urethra tube is anatomically normal.

With reference to FIG. 2, it can be seen that the straight catheter 122a easily passes through the generally straight penile urethra 110, though as the catheter tip reaches the curved junction of the bulbar urethra 112 and the membranous urethra 114, difficulty may be encountered as the generally straight catheter meets a curve in the passage and significant urethral trauma can occur here if manipulation will not allow progress. The angle of the curve is typically between 45 and 90 degrees, requiring significant distortion of the urethra to accommodate the straight catheter, or else significant deflection of the catheter to conform to the curved urethra.

Although the issue of a catheter having to move through a curved passage is somewhat alleviated with catheter 122b (FIGS. 3 and 4) due to its curvature at the tip, impingement of the tip on the anterior wall of the straight penile urethra 110 may occur during insertion and then again at the junction of the bulbar urethra 112 and the membranous urethra 114, particularly at location X1 as shown in FIG. 3.

As shown in FIG. 4, penetration of the prostatic urethra 116 at location X2 is possible, causing a false passage, because the fixed angle of the catheter tip is not steep enough to pass up towards the bladder neck. As shown in FIG. 5, once a false passage is created, it can be more difficult to pass the catheter 122b into the bladder 120 as the tip will usually just re-enter the false passage created at location X2. This is a very common scenario on attempted passage of a urethral catheter.

FIG. 6 illustrates a further difficulty in using catheter 122b, in this case the patient has had a previously excavated prostate gland due to previous prostatic surgery such as a TURP (transurethral resection of the prostate) procedure. The catheter 122b impinges under the bladder neck 118, preventing the catheter 122b from passing into the bladder 120 for successful catheterisation.

The problems illustrated above demonstrate that there is a need for a new type of catheter suitable for inserting into the bladder via the urethra. The deflectable tip of the catheter must be configured to the specific anatomy of the male urethra and the steering mechanism designed for the requirements of a disposable device.

The deflection mechanism preferably should be simple, cost effective, very light, easy and cheap to manufacture, not affected by contact with fluids, easily sterilisable with the catheter, preferably without metallic components (so that removal is not required for patients needing an MM scan), able to be readily operated with a single finger even by a disabled person, and preferably easily and fully removable without affecting catheter function, and/or at least provide a useful alternative to what is available at present.

SUMMARY OF INVENTION

According to one aspect of the invention there is provided a urinary catheter, comprising:
  a hollow catheter body configured to be inserted within the urethra of a patient, the catheter body having an elongate portion, a tip portion near the distal end of the elongate portion and an engagement portion spaced from the distal end where a user can grasp the catheter, the tip portion being deflectable for steering the catheter within the urethra to allow the catheter to follow a natural curvature of the urethra, the tip portion movable from a generally straight condition to a deflected condition wherein deflection of the tip portion occurs while the elongate portion remains generally straight, wherein the catheter body has a main channel formed therein for draining urine from a bladder and at least one further channel formed remote from the main channel and in which a flexible steering member can be situated, with each further channel extending from the distal end to a location near the engagement portion with the steering member being secured within the further channel at the tip portion and configured for engagement by a user externally of the catheter to deflect the tip portion.

According to preferred embodiments of the invention, the hollow catheter body narrows at the tip portion.

Preferably, a wall thickness of the hollow catheter body reduces at the tip portion. Preferably, the tip portion is configured to deflect about an arc commencing at the intersection of the elongate portion and tip portion, the tip portion being generally straight at a distal end thereof.

Preferably, the elongate portion is stiffer than the tip portion and configured to remain in a generally straight condition during use. Preferably, the length of the tip portion is approximately 2 to 4 cms, although may be more or less than 2 to 4 cms. Preferably, the tip portion is configured to deflect in a plane coincident with a longitudinal axis of the elongate portion. Preferably, the tip portion can deflect through an angle up to 90 degrees.

Preferably, the catheter comprises first and second further channels, each with a steering member received therein, the first and second further channels being angularly spaced from each other to deflect the tip portion of the catheter body without lateral torsion within the urethra.

The first and second channels may be spaced at an angle of approximately 40 degrees to each other.

The catheter may further comprise an inflatable balloon spaced from the flexible tip and a balloon inflation channel extending between the balloon and a connector at the proximal end of the catheter for communicating fluid to the balloon for inflation.

Preferably, the steering member is a nylon or similar synthetic polymer string. Preferably, the catheter further comprises an engagement member coupled to the end of the steering member for engagement by a user to deflect the tip portion.

Preferably, the engagement member is biased into an upright position to facilitate operation by a digit of the user. More preferably, the engagement member is biased into the upright position by tension on the steering member. Alternatively, the engagement member is shaped to sit on the catheter body in an upright position. In such embodiments, the engagement member can have a concave base that abuts the exterior surface of the catheter body. Alternatively, the engagement member is a lever coupled to the exterior of the catheter body at a point about which it is pivotable.

According to another aspect of the invention, there is provided a method of catheterising a bladder of a male patient, including the steps of:
providing a catheter of the above described type;
inserting the catheter into the urethra of the patient; and
deflecting the tip portion to steer the catheter through the urethra as the catheter is inserted into the urethra.

The method may further include the step of retracting the catheter slightly upon encountering resistance during insertion, and then deflecting the tip portion as the catheter is re-advanced into the urethra.

BRIEF DESCRIPTION OF THE DRAWINGS

In order that the invention may be more easily understood, an embodiment will now be described, by way of example only, with reference to the accompanying drawings, in which:

FIG. 1 is an illustration of the anatomy of the male urethra;

FIG. 2 illustrates a conventional straight catheter attempting to catheterise the urethra;

FIGS. 3 to 6 illustrates a Coudé tip catheter attempting to catheterise the urethra;

FIG. 7a is a side view of a urinary catheter of one embodiment of the invention, in the non-deflected state;

FIG. 7b is a side view of the catheter of FIG. 7a in the deflected state of use;

FIG. 9 is a close view of the catheter of FIG. 7a;

FIG. 10a is a sectional view of the catheter of FIG. 9, the section taken along Line A-A of FIG. 9;

FIG. 10b is a sectional view of the catheter of FIG. 9, the section taken along Line B-B of FIG. 9;

FIG. 14a is a sectional view of the catheter of FIG. 11, the section taken along Line C-C of FIG. 11;

FIG. 14b is a sectional view of the catheter of FIG. 11, the section taken along Line D-D of FIG. 11;

FIGS. 18 to 21 illustrate the catheter of one embodiment of the invention in the process of catheterising the urethra, including following previous transurethral resection of the prostate (TURP) (FIG. 21).

DETAILED DESCRIPTION

Figure 8A:
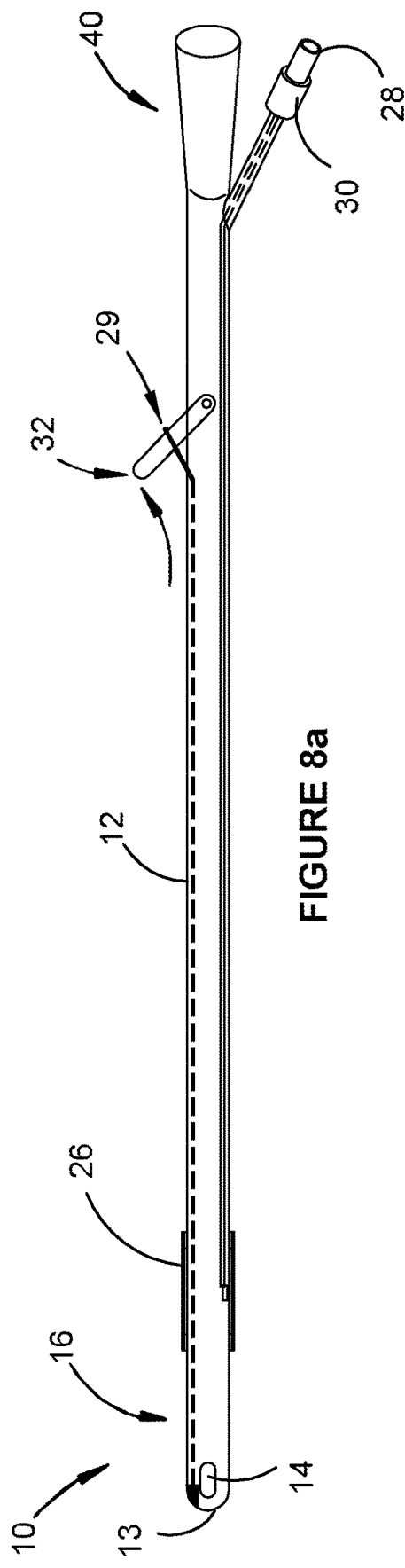
FIG. 8a is a side view of a urinary catheter of another embodiment of the invention, in the non-deflected state.

A urinary catheter 10 according to a preferred embodiment of the invention is shown in FIGS. 7a and 7b.

The urinary catheter 10 includes a hollow catheter body 12. The hollow catheter body 12 is configured to be inserted into the urethra of a patient. The catheter body 12 is elongate and has a tip portion 16 near a distal end 13 thereof and an engagement portion 18 spaced from the distal end 13 and where a user can grasp the catheter. The tip portion 16 is deflectable for steering the catheter 10 within the urethra.

The hollow catheter body 12 has a drainage aperture 14 at the distal end 13 of the catheter body 12 and through which urine can be drained from the bladder.

The engagement portion 18 of the catheter body may include a handle or grip formed on the catheter body 12 (not shown). In other embodiments, the catheter body 12 may be contoured, for example with indentations where fingers can be received, so that the engagement portion 18 is formed in the catheter body 12.

The catheter body is preferably formed of conventional materials, i.e. a silicone-based plastic using conventional moulding/forming techniques, and as a single piece. Those skilled in the art will appreciate that other materials may be used, such as latex rubber for example.

Figure 9:
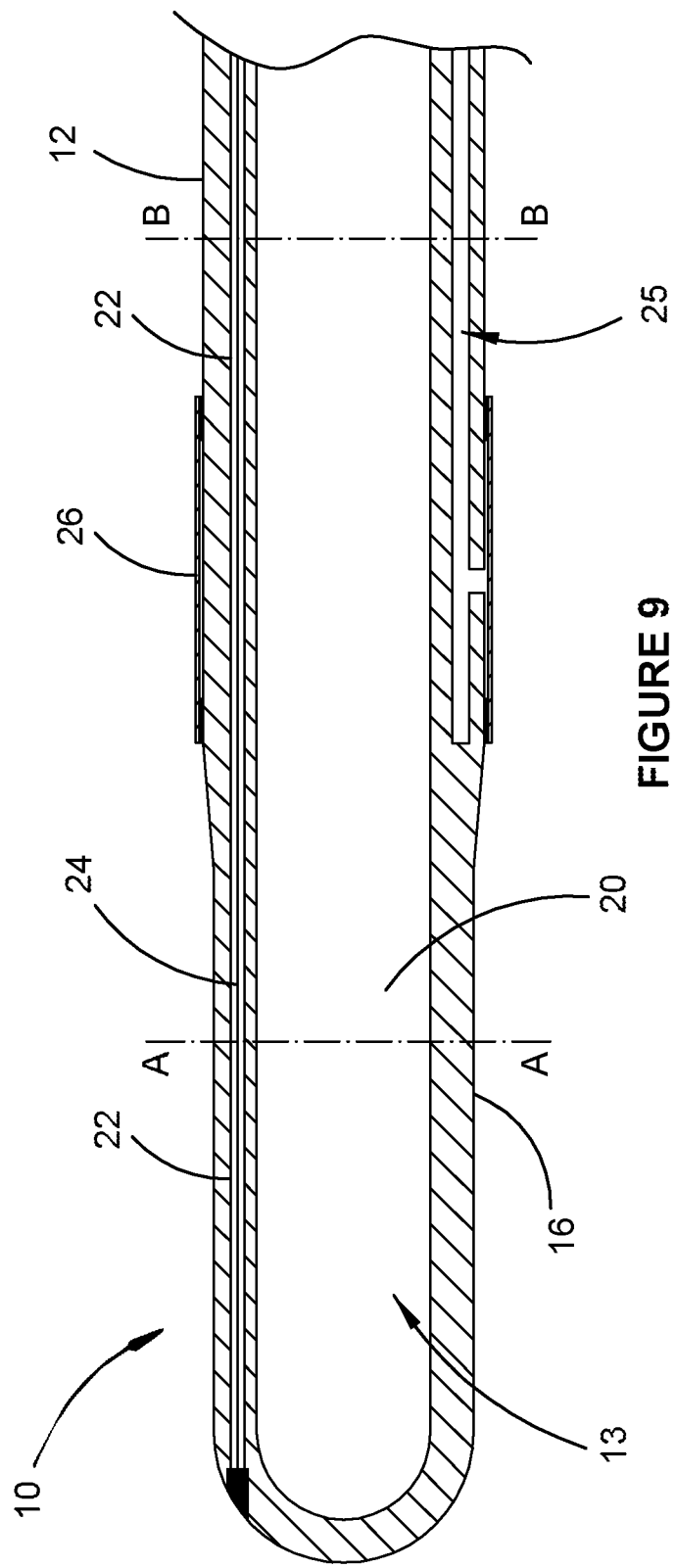
Figure 13B:
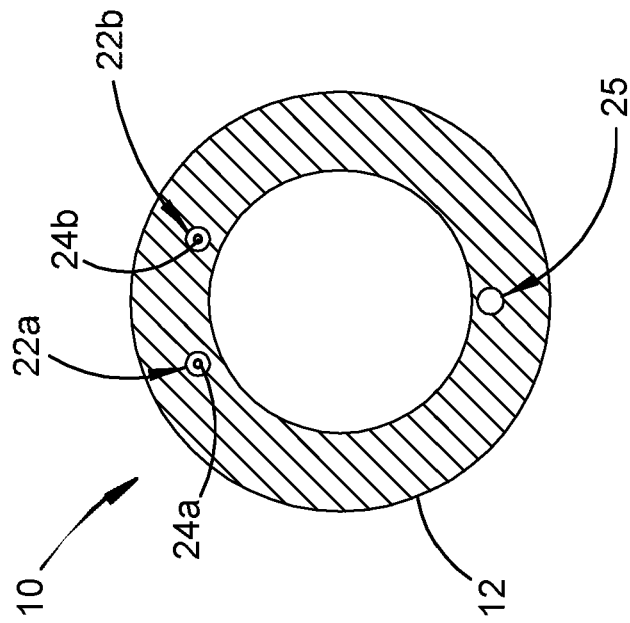
FIGS. 13a and 13b are sectional views of a catheter of another embodiment of the invention, the sections taken in equivalent locations to those of FIGS. 10a and 10b.
Figure 13A:
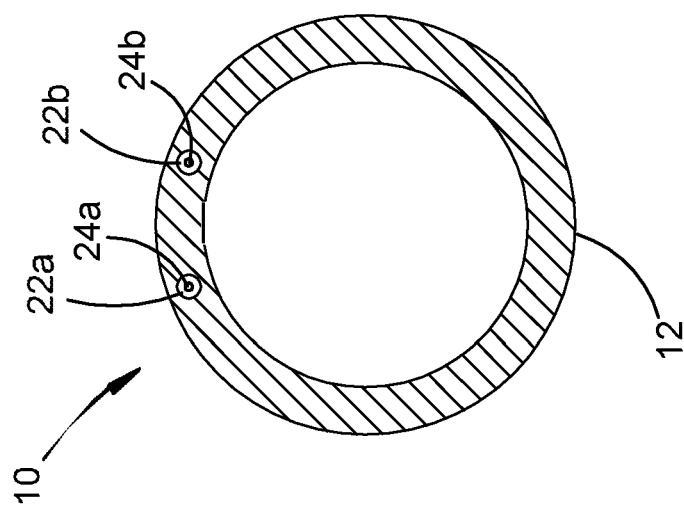

With reference to FIGS. 9 to 10b, it can be seen that the catheter body 12 has a main channel 20 for draining urine from the bladder and at least one further channel 22 formed remote from the main channel 20 and in which a flexible steering member 24 can be received. In the embodiments of FIGS. 10a and 10b, a single steering member 24 is used. In the embodiments of FIGS. 13a and 13b, two steering members are used.

Channel(s) 22 extends from the distal end 13 to a location near the engagement portion 18 with the steering member 24 being secured within the channel 22 at the distal end 13 by plug 15 and, at an opposite end thereof, configured for engagement by a user externally of the catheter 10 to deflect the tip portion 16. This allows the catheter 10 to be steered after it is inserted into a patient's urethra. Engagement of the steering member 24 at the end remote from the distal end 13 is via an engagement member 32, which will be described in further detail below.

The hollow catheter body 12 is configured to enable deflection at the tip portion 16. This allows the catheter 10 to simulate the angle of curvature of the urethra to facilitate insertion without the above described issues. The tip portion 16 is actively deflectable by a user, i.e. under deliberate action, to facilitate insertion of the catheter 10 into the urethra.

To achieve this, in some embodiments the tip portion 16 is manufactured to be more flexible than the catheter body but still has some resilience. After a user has removed force from the engagement member 32 that was applied to deflect the tip portion 16, the tip portion 16 straightens, although it may not return to a fully straight state due to the natural curvature of the patient's urethra.

If the entire catheter is made of uniform material, deflection may also be achieved by narrowing of the walls of the catheter body 12 at the tip portion 16, as illustrated in FIG. 9. And in fact, unless the wall thickness of the required deflectable portion of the catheter is less than the rest of the catheter shaft, the whole catheter will bend into a single arc on the application of traction to the steering member. Curvature of the whole length of the catheter shaft will actually make insertion of the catheter more difficult The degree of reduction in wall thickness and the length of the thinner portion of the tip of the catheter need to be custom designed to result in the optimal shape of the catheter tip to conform to the shape of the curved part of the urethra when traction is applied to the steering member. Advantageously, by reducing the wall thickness of the catheter body 1, the tip portion 16 becomes softer, which can also lead to a lower risk of damage to the urethra by penetration of the wall.

In other embodiments, the catheter body 12 may be formed with deformation lines, which may be linear, curved or radial or combinations thereof for example, to facilitate bending of the catheter body at the junction of the tip portion 16 and the catheter body 12. Those skilled in the art will appreciate that other means to induce bending, buckling, twisting or otherwise contorting of the catheter body 12 are also possible.

Research indicates that the average length of the curved section of an adult male urethra is 4-5 cm. Thus the arc of the deflectable tip of the catheter should be calculated for a change in direction of 90 degrees over a distance of 4 to 5 cms. This calculated arc is then applied to a deflectable tip section, which is preferably 2 to 4 cms long, but may be longer or shorter than this length. Preferably, the length of the tip portion 16 is 2 to 4 cms for use with adult males, the most common users of such a device, although it will be appreciated that the catheter 10 may also be available in other sizes for use with males of other ages.

As will be described in more detail below, the tip portion 16 is configured for deflection in a plane coincident with a longitudinal axis of the elongate portion. This single plane deflection without any lateral or sideways movement is provided to allow the catheter 10 to take the shape of the urethra to facilitate insertion therein.

Deflection of the tip portion 16 is possible within an angle range of 0 to 90 degrees, to enable the catheter body 12 to follow the natural contour of the patient's urethra.

The narrowing of the hollow catheter body 12 at the tip portion 16 may also assist with insertion of the catheter 10 into the urethra.

Catheter 10 also has a balloon channel 25 (FIGS. 9, 12a and 12b) within the catheter body 12, in which fluid, e.g. water, can be communicated from a connector 28 disposed near a proximal end 40 of the catheter body 12 to an inflatable balloon 26 that, when inflated, helps retain the catheter 10 in position to allow drainage of the patient's bladder on an ongoing basis, typically over a number of days. The inflatable balloon 26 is spaced from the tip portion 16 and preferably sited proximal to or within the deflecting portion of the catheter 10. To maintain the balloon 26 in an inflated state while desired, valve 30 is provided. The above described components are typical of the commonly used Foley urethral catheter. Although illustrated with a single balloon 26, it will be appreciated that multiple balloons may also be used.

As illustrated in FIGS. 13a and 13b, in another embodiment the catheter body 12 has first and second further channels 22a, 22b, each with a respective steering member 24a, 24b received therein. The first and second further channels 22a, 22b are angularly spaced from each other so that the steering members 24a and 24b in each channel 22a, 22b provide stability in the deflection of the tip portion 16 so that deflection is in a plane through the midpoint between the steering members 24a, 24b, to prevent unwanted torsion of the catheter tip.

In the illustrated embodiments, the first and second channels 22a, 22b are angularly spaced from each other at an angle of approximately 40 degrees. It will be appreciated that this angle may be lower than 40 degrees and may also be more than 40 degrees.

In preferred embodiments, the steering member is a flexible nylon string, though it will be appreciated that the steering member may be formed of other materials, particularly other polymers, and take other constructions. It may also be made of a metallic component.

Figure 8B:
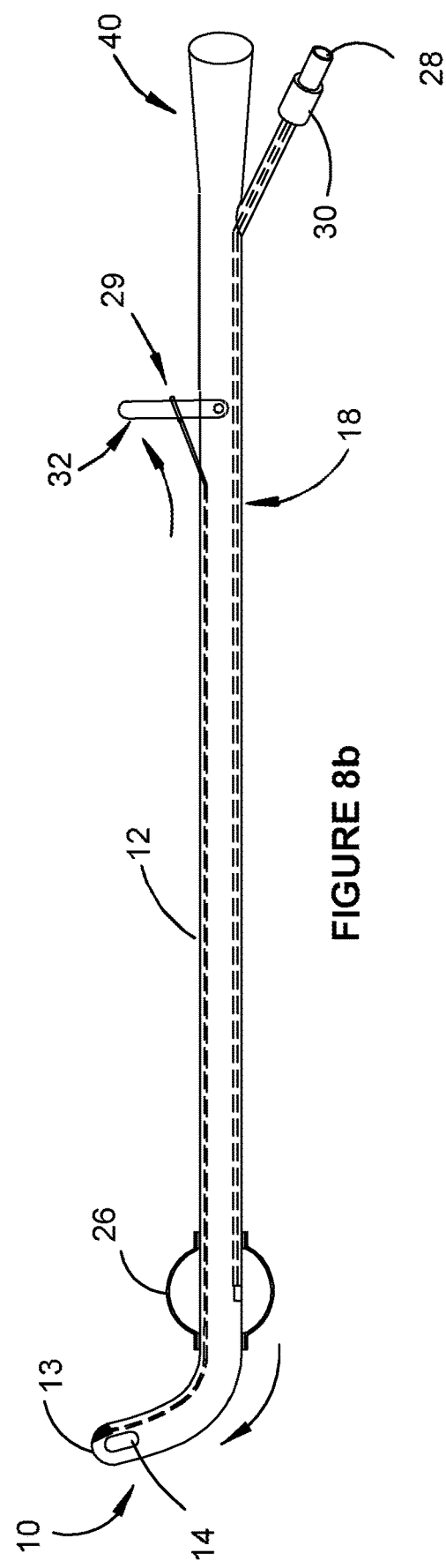
FIG. 8b is a side view of the catheter of FIG. 8a in the deflected state of use.

To enable a user to engage the steering member 24 to deflect the tip portion 16 of the catheter 10, the catheter 10 also includes an engagement member 32 that can be operated by the user. In one embodiment, such as that shown in FIGS. 7a and 7b, the engagement member 32 is a simple ring that is pulled to tension the steering member 24 and deflect the tip 16. In the embodiments shown in FIGS. 8a and 8b, the engagement member 32 is a lever.

Figure 11:
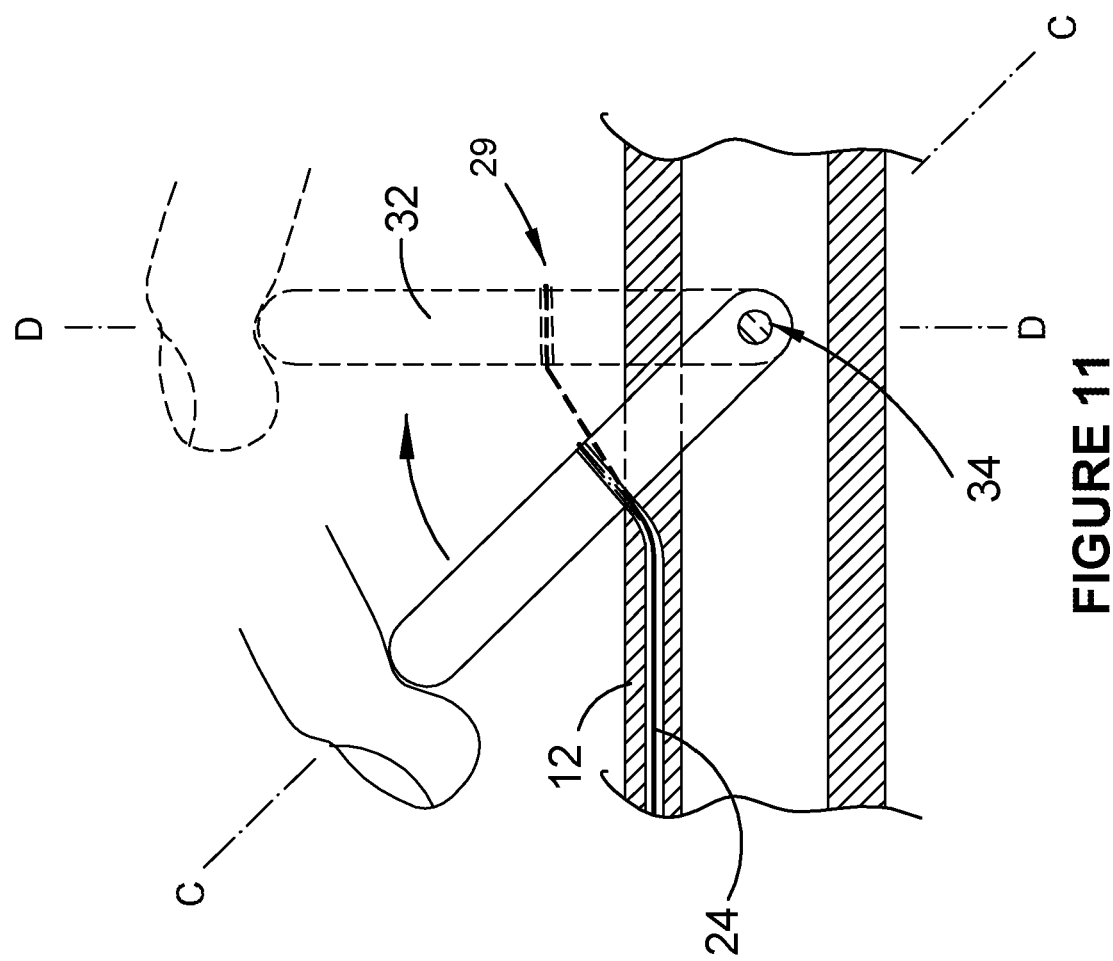
FIG. 11 is a close side view of the catheter of FIG. 8a, showing operation of an engagement member.
Figure 16:
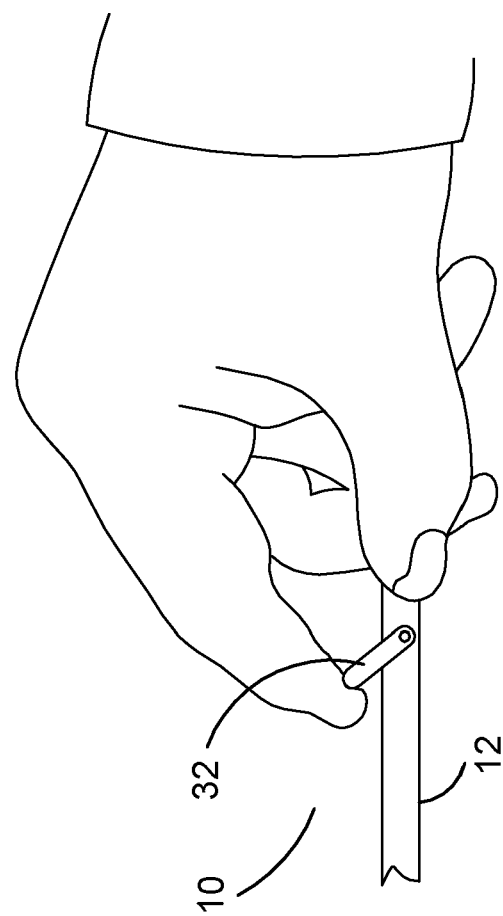
FIG. 16 is a side view of the urinary catheter with the engagement member being operated by a user.

The engagement member 32 is biased into an upright position to facilitate operation by a user. In this regard, by biasing the engagement member 32 into an upright position, a user can easily engage and operate member 32 with a single digit while the rest of the hand is used to hold the catheter 10 during introduction. FIGS. 11 and 16 show the engagement member 32 being engaged and moved to manipulate the tip portion 16. In use, a user will support the catheter body 12 at the engagement portion 18 with one hand and have their second hand further toward the distal end 13 to try and manipulate the catheter 10. As such, limited dexterity remains so it is important that the engagement member 32 be as accessible as possible.

In some embodiments, the engagement member 32 may be biased into the upright position by tension on the steering member 24. Such a configuration is shown in FIG. 11. Markings on the catheter body 12 may be provided to allow a user to estimate the angle of deflection of the tip portion 16.

Figure 12B:
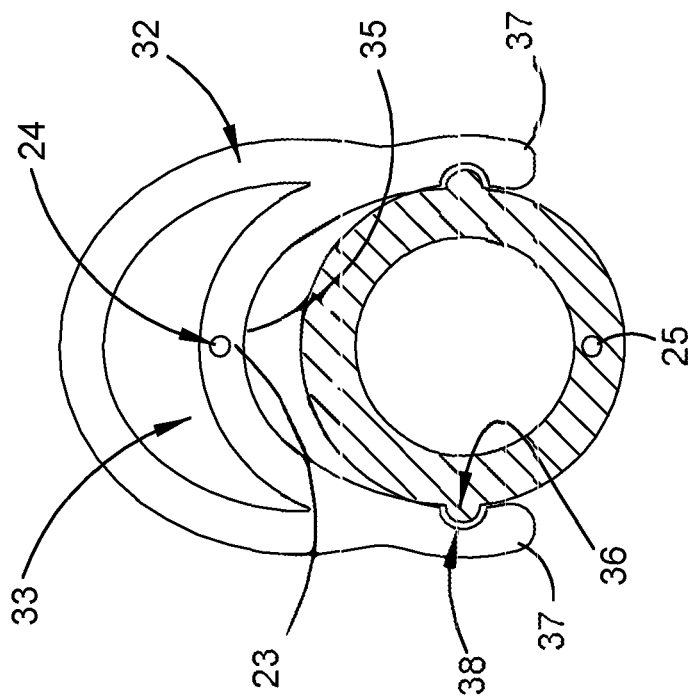
FIG. 12b is a sectional view of the catheter of FIG. 11, the section taken along Line D-D of FIG. 11.
Figure 12A:
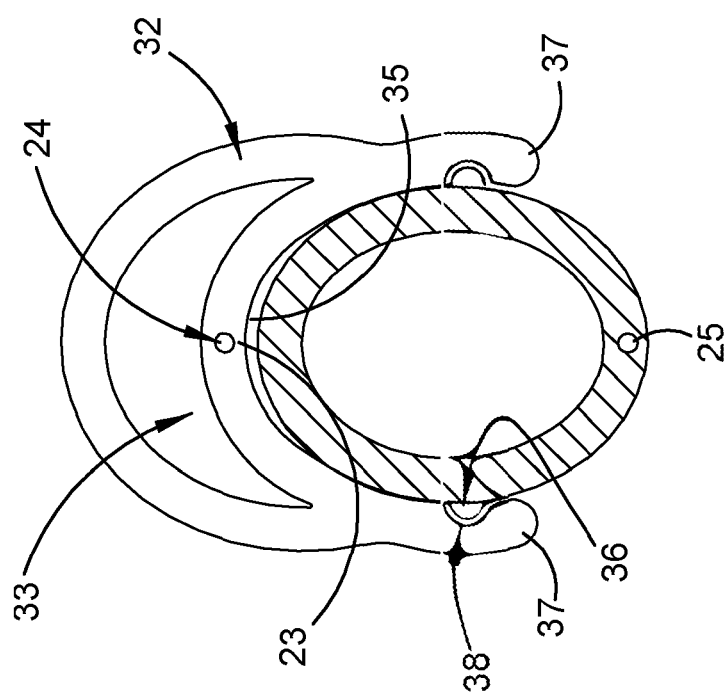
FIG. 12a is a sectional view of the catheter of FIG. 11, the section taken along Line C-C of FIG. 11.
Figure 15:
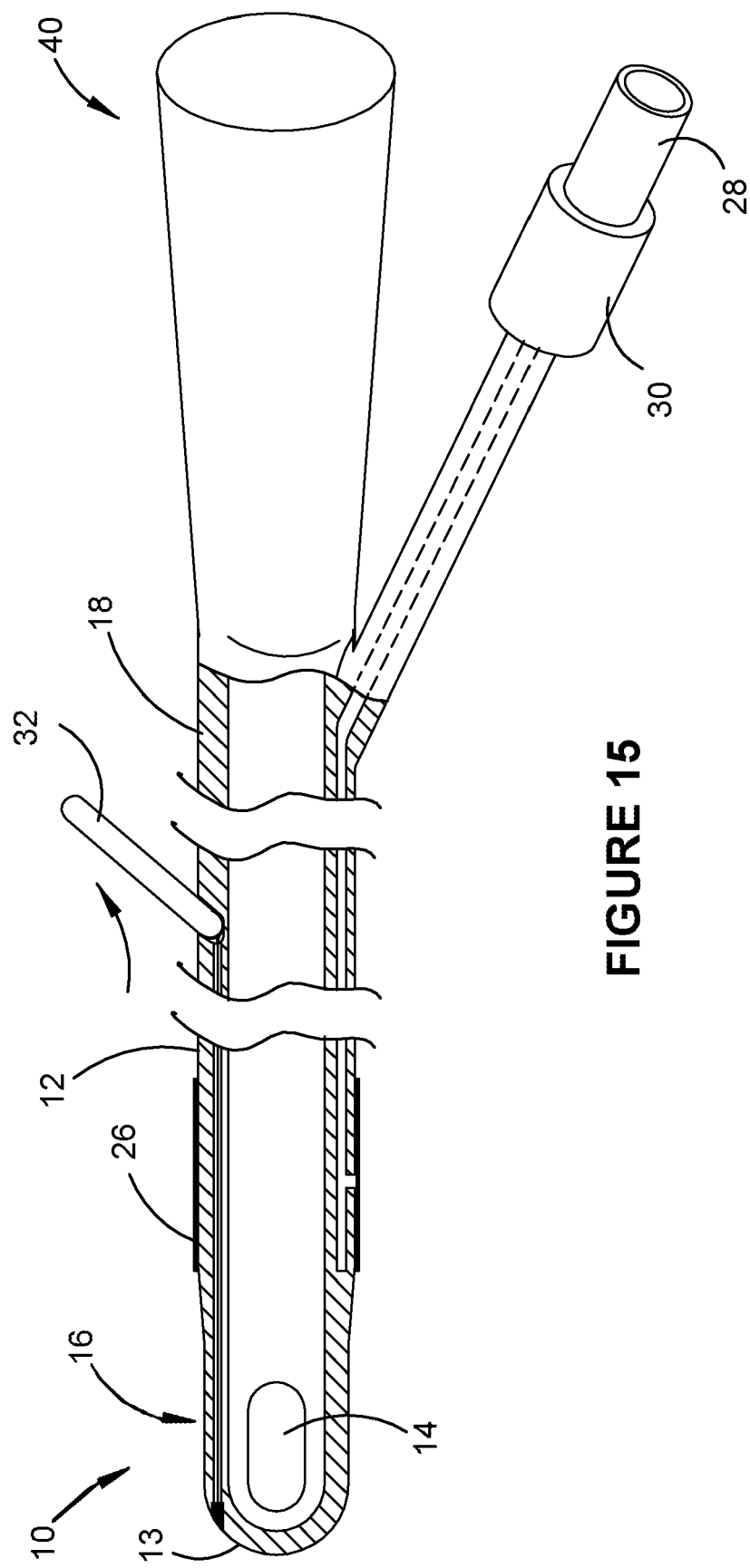
FIG. 15 is a side view of a urinary catheter of another embodiment of the invention.
Figure 17:
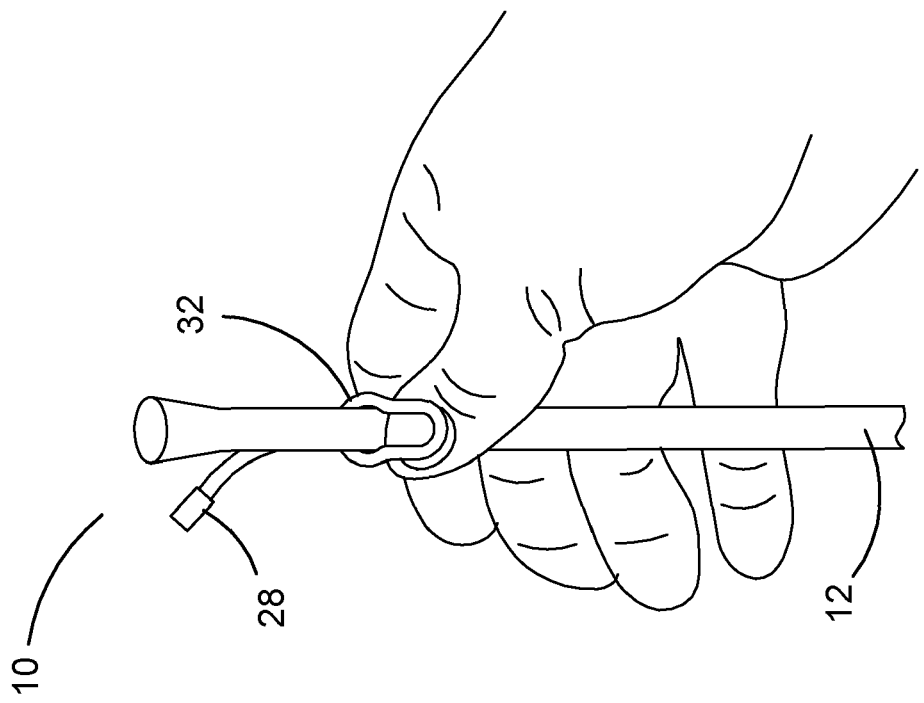
FIG. 17 is a plan view of the urinary catheter illustrating a configuration of the engagement member which makes it possible for patients who self catheterise to operate the engagement member using the thumb of the inserting hand.

In other embodiments, the engagement member 32 is shaped to sit on the catheter body 12 in an upright position. In the embodiments of FIGS. 12a and 12b, the engagement member 32 has a curved or concave base that abuts the exterior surface of the catheter body 12, at one point of its arc of pivot. In another example, the catheter body 12 is formed with a recess in which the engagement member 32 sits, as illustrated in FIG. 15.

As can be seen in FIGS. 12a, 12b, 14a and 14b, the engagement member 32 has a rounded base 35 that has a shape which is complementary with the outer surface of the hollow catheter 12 so that the engagement member 32 sits on the hollow catheter 12. The rounded base 35 is rounded between lateral sides, as can be seen in FIGS. 12a, 12b, 14a and 14b, but may be generally flat in its depth dimension (as viewed in FIG. 11) so as to sit on the catheter 12 in a generally stable manner so as to be presented to a user for easy engagement in use.

In the embodiment shown in FIG. 14a, the rounded base 35 and tension of the steering member 24 may be sufficient to retain the engagement member 32 in a generally upright condition. In the embodiment of FIGS. 14a and 14b, the engagement member 32 is formed with legs 37 that extend partially around the catheter body 12 and over point 36 about which the engagement member 32 is pivotable.

In the embodiment of FIGS. 12a, 12b, 14a and 14b, the engagement member 32 acts as a lever coupled to the exterior of the catheter body 12 at point 34 (FIG. 11). This provides mechanical advantage to assist with deflection of the tip portion 16. As can be seen in FIGS. 12a, 12b, 14a and 14b, a knob 36 is formed on the sides of the catheter body 12 and corresponding sockets 38 are formed in the engagement member 32, the knobs 36 and sockets 38 cooperate to pivotably support the engagement member 32 by legs 37 to allow operation of the engagement member 32. It will be appreciated that in other embodiments the knobs 36 may be formed on the engagement member 32 and the sockets 38 formed in the catheter body 12. Again, it may be the base 35 of the engagement member 32 or the tension of the steering member 24 (or both) that keeps the engagement member 32 in position and upwardly biased for easy access by a user.

During manufacture of the engagement member 32, single or double holes may be incorporated into it, for passage of one or each steering member 24. During assembly, the engagement member 32 can then be 'clipped' on to the catheter body 12, and the single or double steering members 24 pulled through holes 23 in the engagement member 32 and secured using conventional securement means.

As the engagement member 32 is essentially clipped on to the catheter body 12, it can be easily removed after insertion. To do so, the engagement member 32 is activated to deflect the tip from the at rest position and the one or each steering member 24 cut. After the steering member 24 is cut, the tip portion 16 will return to its at rest and undeflected position, thereby drawing the steering member 24 back into its channel 22. The engagement member 32 can then be unclipped and discarded.

Aperture 33 is configured so that a user may insert a digit through the aperture for activation of the engagement member 32. The engagement member 32 and aperture 33 may take other forms or shapes, such as elliptical or complex shapes, such as an inverted 'trigger' and may be a simple lever without an aperture 33.

The above described engagement members 32 provide a simple, reliable and lightweight means for applying tension to the steering member 24 to deflect the tip portion 16. This is important as urethral catheters are often retained in the urethra for many days at a time after insertion. Because patients potentially will have to walk and perform routine daily routines with a catheter indwelling, a deflection mechanism which is heavy or bulky will be completely unsuitable for purpose. As such, the bigger, heavier and more complex steering systems of catheters used to address the issue of curved anatomy in other medical fields are simply unsuitable for use as urethral catheters.

The above described catheter 10 is configured for use in catheterising the bladder of a male patient. In use it is inserted into the urethra of the patient and the tip portion 16 is then manipulated to facilitate insertion into the bladder. This may be by steering the catheter around curves of the urethra by deflecting the tip portion as the catheter is inserted into the urethra. Manipulation of the tip portion 16 may also be simply to dislodge the catheter from an otherwise impacted or jammed position and allow insertion to proceed.

The catheterisation process using catheter 10 is described in more detail with reference to FIGS. 16 to 21.

As previously described, immediately prior to insertion of the tip of the catheter into the urethra, the user places manual traction on the penis in order to steady it, and importantly to straighten the penile urethra 110, so that the catheter tip 13 is more likely to pass this part of the urethra 110 without any resistance.

The catheter 10 is introduced with lubricant into the penile (distal) urethra and passed along the straightened distal urethra 110. This is usually the easiest part of insertion of a catheter 110, provided that the catheter 10 is straight and the urethra tube 110 is anatomically normal.

With reference to FIG. 18, it can be seen that the catheter 10 is inserted in its generally straight form and easily passes through the generally straight penile urethra 110. However, the lining (mucosa) of the urethra can in fact be quite irregular, particularly if there has been any previous trauma, infection, instrumentation or operation. Irregularity of the urethra is particularly common after previous prostate surgery, especially TURP procedures.

As the catheter is gently pushed forward, if the tip impinges on any obstruction, due to any irregularity or defect of the urethral mucosa, the tip of the catheter can be slightly deflected upwards by the user, and then gently pushed further forward. This upward deflection of the catheter tip lifts it away from the posterior wall of the urethra. If the tip can't be advanced any further, then the catheter is gently withdrawn perhaps just a few millimetres, and the catheter tip is deflected just a little more. If the catheter then advances, no further deflection is applied, and the catheter is pushed through until urine flows out of the main catheter lumen.

With reference to the term 'upwards', those skilled in the art will appreciate that catheterisation is generally performed with a patient lying on their back and that an upwards direction would be towards a ceiling, though catheterisation may also be performed with a patient lying on their side or prone, in which case the deflection would be in a direction generally forward of their body.

As the catheter is pushed further forward after bypassing an obstruction, the traction on the steering member can be retained, resulting in persistent deflection of the catheter tip, or the traction can be released, allowing the catheter tip to passively straighten at least fractionally, prior to further advancement. Relaxing traction on the steering element after passing an obstruction may lower the risk that the deflected catheter tip may impinge on the anterior wall of the more proximal urethra.

The whole insertion process is performed using the manual sensation of resistance alone, and unlike other actively steerable devices, does not rely on either visual or radiological guidance.

As the catheter tip reaches the curved junction of the bulbar urethra 112 and the membranous urethra 114, difficulty may be encountered as the generally straight catheter meets a curve in the passage. Upon a user receiving tactile feedback by way of resistance that the tip is in this position, the catheter 10 may be retracted slightly (possibly only a few millimetres) and the engagement member 32 engaged to deflect the tip as the catheter 10 is subsequently advanced, thereby allowing the catheter 10 to pass through the curved junction of the bulbar urethral 112 and the membranous urethra 114 without impingement. This avoids the significant urethra trauma that can occur here, particularly false passages formed at location X1, if manipulation will not allow progress, as described in relation to FIG. 4.

As illustrated in FIGS. 18 and 19, deflection of the tip may be maintained by using the engagement member 32 as the catheter 10 is advanced through the prostatic urethra 116, past the bladder neck 118 and into the bladder 120.

Those skilled in the art will appreciate that the insertion process illustrated in relation to FIGS. 16 to 19 is much simpler and less prone to local trauma than that illustrated in FIGS. 2 to 6. This will particularly be the case where a patient has had a previously excavated prostate gland due to previous prostatic surgery such as a TURP procedure.

Owing to the above described configuration of the catheter, catheterisation can be performed solely using tactile feedback from the catheter.

Utilising anatomical knowledge of the male urethra has enabled the design of a new steerable urethral catheter which makes it specifically suitable for catheterisation of the male urethra by anyone who is physically able to pass a urethral catheter, including the patient himself. The steering control mechanism in preferred embodiments is a simple, single component, trigger-like lever, which requires a uni-directional, short, single digit movement. The single component can be manufactured very cheaply of plastic and attached to a simple monofilament nylon string.

Many previously designed steerable devices have required the strength of metal wire steering elements, some of which have been multi-filament to permit flexibility. This new design allows a nylon string to be used as the steering member because its larger size does not require the strength of steel, and full deflection can be achieved even with some elasticity of the steering element.

The advantages of a nylon steering element in a disposable catheter which may need to be retained in the bladder for several months include: cheapness and simplicity of manufacture; easier attachment to the catheter tip by heat fusion, a plastic plug or glue; potentially better glide characteristics in a silicone channel; absence of corrosion when in prolonged contact with fluids; absence of potential allergy to metallic components; easy sterilisation with the catheter without modification of the sterilisation technique; resistance to biofilm and potential infection, especially compared with a multi-filament wire; absence of radiological reflection interfering with the image on ultrasound, CT scan or MRI; contra-indication of a metal component in an MRI scan, necessitating possible catheter removal prior to MRI; and easier cutting of the string with standard ward scissors if the engagement member is removed.

Many modifications of the above embodiments will be apparent to those skilled in the art without departing from the scope of the present invention. For example, catheter 12 may be other than round, such as elliptical for example, and may not have a consistent cross-sectional shape along its length.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

REFERENCE NUMERALS

10. Urinary catheter
12. Hollow catheter body
13. Distal end
14. Drainage aperture
15. Plug
16. Tip portion
18. Engagement portion
20. Main channel
22. Further channel
24. Steering member
25. Balloon channel
26. Inflatable balloon
28. Connector
29. Fixation point for steering member
30. Valve
32. Engagement member
33. Aperture
34. Pivot point
35. Rounded base of engagement member
36. Knob
37. Legs of engagement member
38. Socket
40. Proximal end of catheter body

The invention claimed is:

1. A urinary drainage catheter, comprising:
a hollow catheter body configured to be inserted into a male urethra, the catheter body having:
an elongate portion having a substantially consistent outer diameter and wall thickness, the elongate portion being substantially straight in an unbiased state;
a tip portion having a substantially consistent outer diameter and wall thickness near a distal end of the elongate portion, the outer diameter of the tip portion being decreased in size with respect to the outer diameter of the elongate portion at a junction between the elongate portion and the tip portion, the tip portion being substantially straight in the unbiased state; and
an engagement portion spaced from the distal end where a user can grasp the catheter, wherein
the tip portion has a side facing aperture,
the tip portion is closed and rounded at an end thereof and deflectable about the junction due to the decrease in diameter of the hollow catheter body at the junction and a decrease in wall thickness of the hollow catheter body at the junction, for the purpose of steering the catheter within the male urethra to allow the catheter to follow a natural curvature of the male urethra,
the tip portion being movable from a generally straight condition to a deflected condition in which deflection of the tip portion occurs while the elongate portion remains generally straight,
the catheter body has a main channel formed therein for draining urine from a bladder, and at least one further channel formed remote from the main channel and in which a flexible steering member can be received, a lumen of the at least one further channel extending from the distal end to a location near the engagement portion with the steering member being secured within the at least one further channel at the tip portion and configured for engagement by the user externally of the catheter to deflect the tip portion,
the tip portion and the elongate portion have a combined length that is sized to extend only as far as the bladder when inserted in the male urethra,
the catheter further comprises an engagement member coupled to a proximal end of the steering member for engagement by the user to actively deflect the tip portion within the male urethra,
when inserted in the male urethra, active deflection of the tip portion occurs in an upward direction in a sagittal plane and is restricted to an angle less than or equal to 90 degrees from horizontal,
the engagement member is coupled to the proximal end at a location that is external to the male urethra when the tip portion and the elongate portion are inserted in the male urethra, such that the user is able to engage and operate the engagement member when the tip portion and elongate portion are within the male urethra; and
the engagement member is biased into an upright position and projects away from the catheter body to facilitate operation by a single digit of a hand with which the user is holding the catheter.

2. The urinary drainage catheter according to claim 1, wherein the hollow catheter body narrows at the junction.

3. The urinary drainage catheter according to claim 1, wherein the decrease in wall thickness of the hollow catheter body at the junction is generally maintained throughout the tip portion.

4. The urinary drainage catheter according to claim 1, wherein the tip portion is configured to deflect about an arc commencing at the junction of the elongate portion and tip portion.

5. The urinary drainage catheter according to claim 1, wherein the elongate portion is stiffer than the tip portion and configured to remain in a generally straight condition during use.

6. The urinary drainage catheter according to claim 1, wherein a length of the tip portion is in a range of 2 cm to 4 cm.

7. The urinary drainage catheter according to claim 1, wherein the tip portion is configured to deflect in a single direction in a plane coincident with a longitudinal axis of the elongate portion.

8. The urinary drainage catheter according to claim 7, wherein passive straightening of the deflected tip is determined by a resilience of a material used to manufacture the catheter.

9. The urinary drainage catheter according to claim 1, wherein a single steering cable is utilized.

10. The urinary drainage catheter according to claim 1, wherein
the at least one further channel is a first further channel, and
the catheter body includes a second further channel,
each of the first further channel and the second further channel have a respective steering member received therein, and
the first further channel and the second further channel are angularly spaced from each other to prevent lateral deflection of the tip portion of the catheter.

11. The urinary drainage catheter according to claim 1, further comprising an inflatable balloon spaced from the flexible tip, and a balloon inflation channel extending between the balloon and a connector at a proximal end of the catheter for communicating fluid to the balloon for inflation.

12. The urinary drainage catheter according to claim 1, wherein the engagement member is configured to be operated by the single digit of the hand holding the catheter.

13. The urinary drainage catheter according to claim 1, wherein the engagement member is shaped to sit on the catheter body in an upright position, the engagement member having a concave base that abuts an exterior surface of the catheter body.

14. The urinary drainage catheter according to claim 1, wherein the engagement member is configured to be attached to the catheter externally to the wall of the hollow catheter body, without impingement on the lumen of the catheter.

15. The urinary drainage catheter according to claim 1, wherein the engagement member is removable from the hollow catheter body.

16. A method of catheterising a bladder of a male patient, including the steps of:
providing a drainage catheter comprising a hollow catheter body configured to be inserted into a male urethra, the catheter body having:
an elongate portion having a substantially consistent outer diameter and wall thickness, the elongate portion being substantially straight in an unbiased state;
a tip portion having a substantially consistent outer diameter and wall thickness near a distal end of the elongate portion, the outer diameter of the tip portion being decreased in size with respect to the outer diameter of the elongate portion at a junction between the elongate portion and the tip portion, the tip portion being substantially straight in the unbiased state, an engagement portion spaced from the distal end where a user can grasp the catheter, a main channel formed therein for draining urine from the bladder, and at least one further channel formed remote from the main channel and in which a flexible steering member can be received, a lumen of the at least one further channel extending from the distal end to a location near the engagement portion with the steering member being secured within the at least one further channel at the tip portion and configured for engagement by the user externally of the catheter to deflect the tip portion;

inserting the catheter into the urethra of the male patient; and as the catheter passes through the urethra, actively deflecting, via an engagement member coupled to a proximal end of the steering member, the tip portion in an upward direction and in a sagittal plane of the male patient to steer the catheter through the urethra as the catheter is inserted into the urethra, wherein the tip portion has a side facing aperture, the tip portion is closed and rounded at an end thereof and deflectable about the junction due to the decrease in diameter of the hollow catheter body at the junction and a decrease in wall thickness of the hollow catheter body at the junction, for the purpose of steering the catheter within the male urethra to allow the catheter to follow a natural curvature of the male urethra, the tip portion being movable from a generally straight condition to a deflected condition in which deflection of the tip portion occurs distal to the junction while the elongate portion remains generally straight, deflection of the tip portion is restricted to an angle less than or equal to 90 degrees from horizontal, the tip portion is resilient and straightens after deflection, the tip portion and the elongate portion have a combined length that is sized to extend only as far as the bladder when inserted in the urethra, the engagement member is coupled to the proximal end at a location that is external to the male urethra when the tip portion and the elongate portion are inserted in the male urethra, such that the user is able to engage and operate the engagement member when the tip portion and elongate portion are within the male urethra, and the engagement member is biased into an upright position and projects away from the catheter body to facilitate operation by a single digit of a hand with which the user is holding the catheter.

17. The method according to claim 16, further including the step of retracting the catheter slightly upon encountering resistance during insertion, and then deflecting the tip portion as the catheter is re-advanced into the urethra.

18. The method according to claim 16, wherein the catheter is configured to be actively steered by tactile feedback alone, independent of any navigational aids including telescopic or radiological guidance.

* * * * *